United States Patent
Debosque et al.

(10) Patent No.: US 11,520,654 B2
(45) Date of Patent: Dec. 6, 2022

(54) SYSTEM WATCHDOG TIMER FOR A DATA PROCESSING SYSTEM

(71) Applicant: SEMICONDUCTOR COMPONENTS INDUSTRIES, LLC, Phoenix, AZ (US)

(72) Inventors: Philippe Debosque, Toulouse (FR); Cornelis Hermanus Voorwinden, Frouzins (FR); Philippe Quarmeau, Colomiers (FR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 141 days.

(21) Appl. No.: 17/248,690

(22) Filed: Feb. 3, 2021

(65) Prior Publication Data
US 2022/0245018 A1    Aug. 4, 2022

(51) Int. Cl.
| | |
|---|---|
| *G06F 11/00* | (2006.01) |
| *G06F 11/07* | (2006.01) |
| *G06F 1/28* | (2006.01) |
| *G06F 11/10* | (2006.01) |
| *G06F 13/20* | (2006.01) |

(52) U.S. Cl.
CPC ............ *G06F 11/0793* (2013.01); *G06F 1/28* (2013.01); *G06F 11/0757* (2013.01); *G06F 11/1004* (2013.01); *G06F 13/20* (2013.01)

(58) Field of Classification Search
CPC ............. G06F 11/0793; G06F 11/0757; G06F 11/1004; G06F 11/1608; G06F 11/348; G06F 11/0754; G06F 11/0751
See application file for complete search history.

(56) References Cited

U.S. PATENT DOCUMENTS

| | | | |
|---|---|---|---|
| 4,866,713 A | 9/1989 | Worger et al. | |
| 5,408,645 A | 4/1995 | Ikeda et al. | |
| 7,174,483 B2* | 2/2007 | Becher | G06F 11/0757 714/E11.003 |
| 2016/0253233 A1 | 9/2016 | Curtis | |
| 2019/0079835 A1* | 3/2019 | You | G06F 11/1497 |

* cited by examiner

*Primary Examiner* — Katherine Lin
(74) *Attorney, Agent, or Firm* — Polansky & Associates, P.L.L.C.; Paul J. Polansky; James Saragosa

(57) ABSTRACT

A method of performing a system watchdog operation of a data processing system using a system watchdog timer includes creating an initial question, starting a timer of the system watchdog timer, receiving an initial answer and an initial data code, calculating an expected data code in response to the initial question, and comparing the initial data code to the expected data code. In response to a mismatch between the initial data code and the expected data code, a bus error signal is generated. In response to a match, the initial answer is compared to the initial question, and in response to a match between the initial answer and the initial question, the timer is reset and the initial data code is stored as a subsequent question, but in response to a mismatch, a remedial action of the data processing system is performed.

13 Claims, 5 Drawing Sheets

US 11,520,654 B2

SYSTEM WATCHDOG TIMER FOR A DATA PROCESSING SYSTEM

FIELD OF THE DISCLOSURE

This disclosure relates generally to watchdog timers, and more specifically system watchdog timers.

BACKGROUND

Watchdog timers monitor an operating condition of a system by counting using a timer. If the timer expires before the watchdog timer receives a reset signal, it detects an irregularity and the watchdog timer undertakes an action such as activating a reset signal to bring system to a safe state. A system watchdog timing function is implemented across a system, such as a processor connected to a separate watchdog timer via a system bus. System watchdog timers add redundancy to the watchdog operation as each part involved in the system watchdog timing function has to be operating properly.

One operating scheme of system watchdog timers is the question and answer (Q&A) watchdog timer. In conventional Q&A watchdog timers, the watchdog circuit sends a specific question to the processor and the processor responds with a unique answer. The watchdog timer performs a remedial action if it reaches a terminal count before it is reset by receiving a correct answer from the processor, and some watchdog timers perform the remedial action immediately upon receiving an incorrect answer. Existing Q&A watchdog timers require large die size, multiple bus transfers, and/or custom algorithms/software.

FIG. 2 illustrates a flow chart of a process 200 associated with the operation of a Q&A watchdog timer and processor known in the art. The processor and Q&A watchdog timer communicate via a system bus and the integrity of the data transmission is protected by an error code, labeled "$PEC_O$". $PEC_O$ could be, for example, a parity bit, CRC bits, or other error correction code bits. Process 200 begins at block 201, where the Q&A watchdog timer creates an initial question, labeled "$Q_O$". The processor then performs action 202 by reading $Q_O$ from the Q&A watchdog timer, and the process proceeds to block 203. At block 203 the processor calculates an answer, labeled "$A_O$", and $PEC_O$. The processor then subsequently performs action 204 by writing $A_O$ and $PEC_O$ to the Q&A watchdog timer, and the process proceeds to block 205. At block 205, the Q&A watchdog timer calculates an expected answer and compares it with the received $A_O$. Also at block 205, the Q&A watchdog timer compares an expected $PEC_O$ and the received $PEC_O$. If the expected answer and $A_O$ do not match, the Q&A watchdog does not reset its timer and performs a remedial action. If the expected answer and $A_O$ do match, the Q&A watchdog resets its timer and creates a subsequent question, labeled "$Q_O$". Process 200 continues by repeating subsequent read actions, calculations, and write actions until an error is detected or the system is shutdown. This operation performs Q&A watchdog timer functions; however, multiple bus transfers and custom calculations increase bus traffic and limit system compatibility.

Systems with many peripherals and/or devices that utilize buses for communication and data transfer can have heavy bus traffic. Known Q&A watchdog timers, such as those implementing the Q&A process 200 of FIG. 2, compete with other devices and peripherals due to the many bus transfers required to perform Q&A watchdog timer functions. In order to increase system performance, system watchdog timers need to reduce bus traffic while maintaining Q&A functionality.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
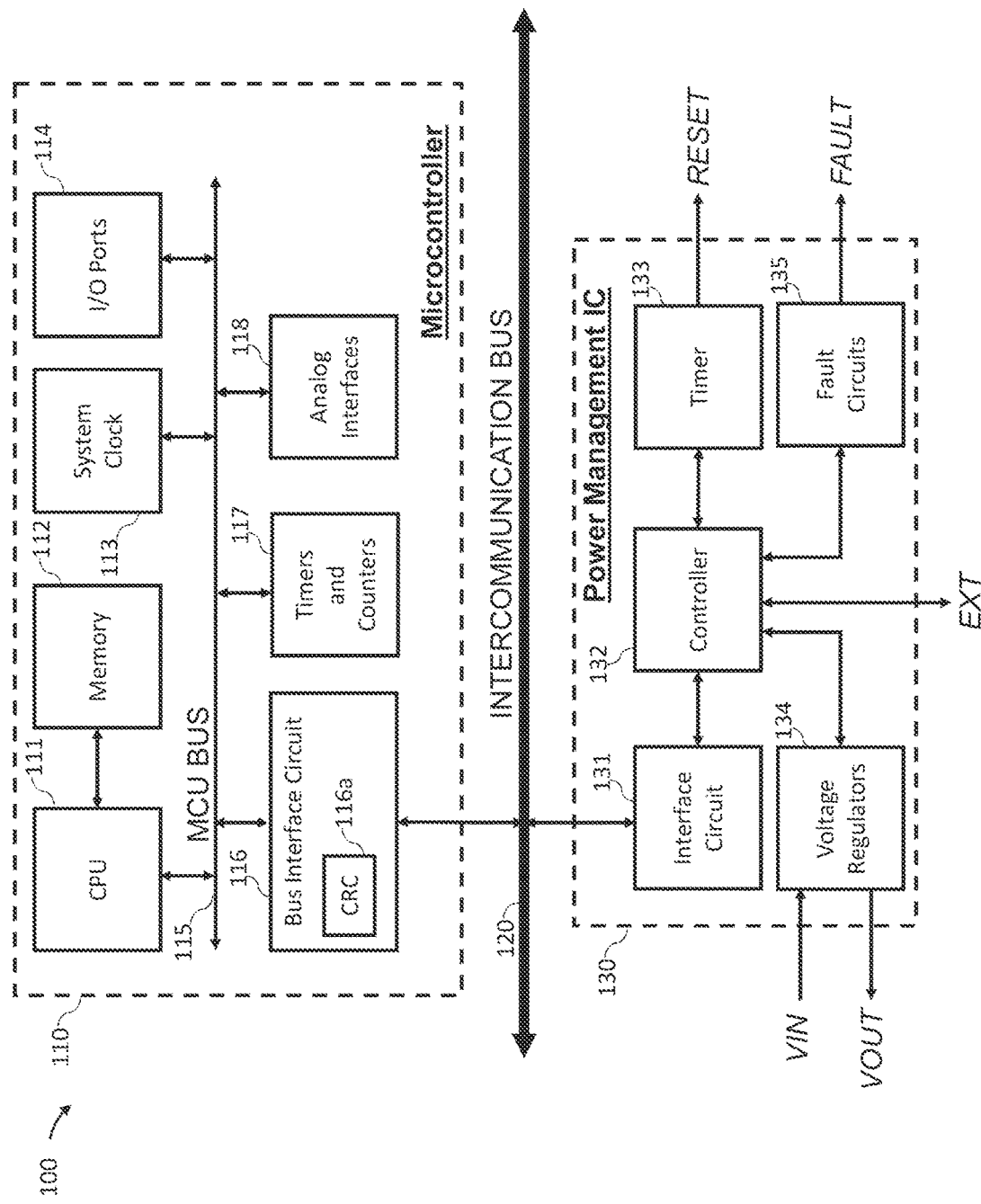
FIG. 1 illustrates in block diagram form a data processing system with a system watchdog timer according to an embodiment of the present disclosure.
Figure 2:
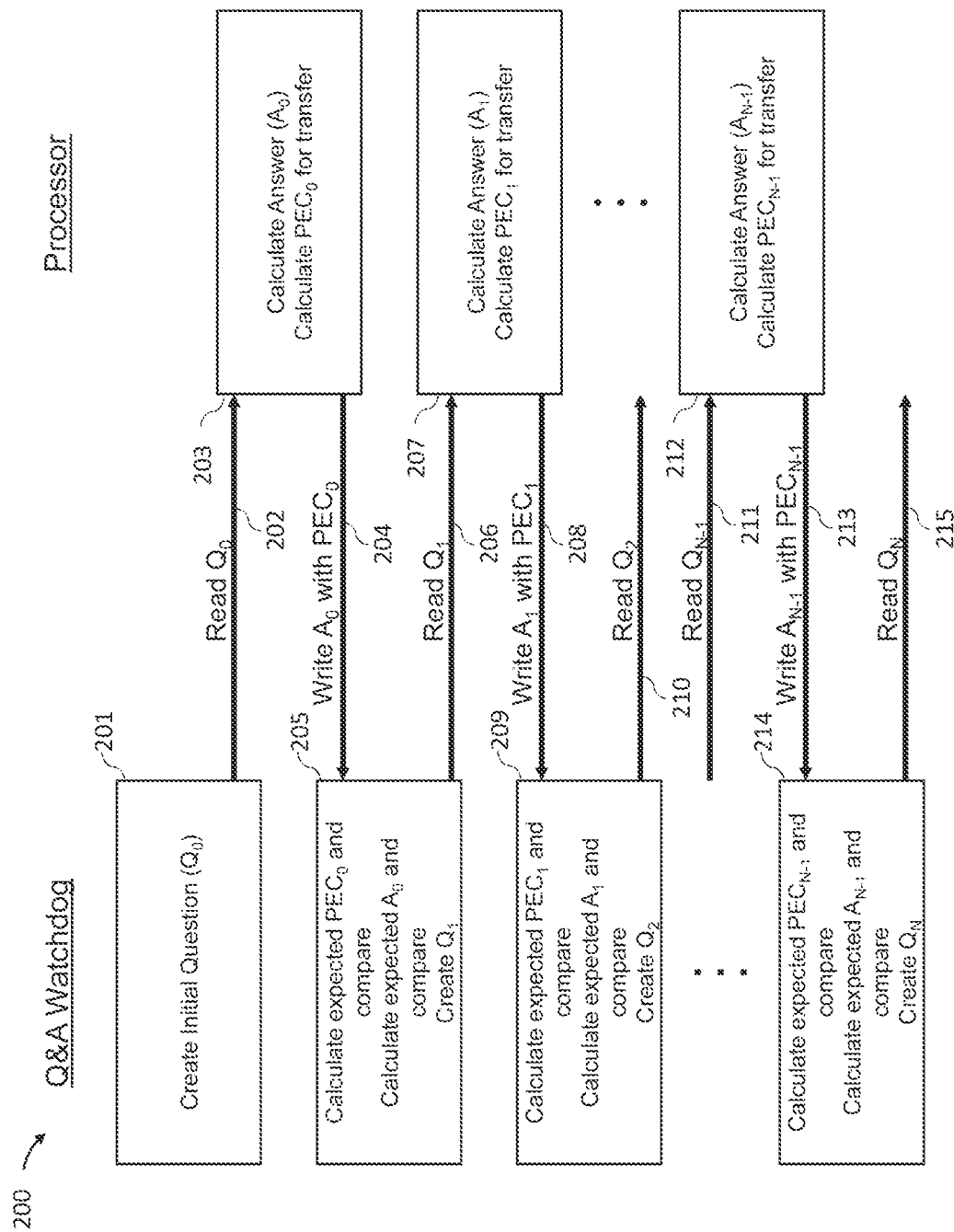
FIG. 2 illustrates a flow chart of a process associated with the operation of a watchdog timer and processor known in the art.

FIG. 1 illustrates in block diagram form a data processing system 100 with a system watchdog timer according to an embodiment of the present invention. Data processing system 100 includes generally a data processor 110, an intercommunication bus 120, and a power management integrated circuit (PMIC) 130. Data processor 110 is bidirectionally connected to intercommunication bus 120. PMIC 130 is bidirectionally connected to intercommunication bus 120. Additional peripherals or devices, not shown in FIG. 1, may be connected to intercommunication bus 120.

Data processor 110 includes a central processing unit (CPU) 111, a memory 112, a system clock 113, a group of input and output ports 114, a bus 115, a bus interface circuit 116, a group of timers and counters 117, and a group of analog interfaces 118. CPU 111 is bidirectionally connected to memory 112 in FIG. 1 through an interconnection such as an internal bus and to bus 115. Bus 115 is bidirectionally connected to each of system clock 113, group of input and output ports 114, bus interface circuit 116, group of timers and counters 117, and group of analog interfaces 118. Bus interface circuit 116 is bidirectionally connected to intercommunication bus 120. Bus interface circuit 116 includes a cyclic redundancy check (CRC) circuit 116a. Data processor 110 may include additional peripherals, not shown in FIG. 1, connected to bus 115. In one embodiment, data processor 110 is a microcontroller integrated in a single integrated circuit package. In another embodiment, data processor 110 is implemented using multiple integrated circuits. In yet another embodiment, CRC circuit 116a is located within CPU 111 instead of bus interface circuit 116. In yet another embodiment, data processor 110 omits CRC circuit 116*a*.

PMIC 130 is a power management circuit with a system watchdog function for monitoring operation of data processor 110. In general, PMIC 130 regulates and monitors voltage supplies of data processing system 100 and also includes a system watchdog timer function for monitoring operation of data processor 110. PMIC 130 includes an interface circuit 131, a controller 132, a timer 133, a group of voltage regulators 134, and a group of fault circuits 135. Interface circuit 131 is bidirectionally connected to intercommunication bus 120. Controller 132 is connected to interface circuit 131, timer 133, voltage regulators 134, fault circuits 135, and one or more external terminals for receiving and/or providing one or more signals labeled "EXT". Timer 133 has an output for providing a signal labeled "RESET" to data processor 110. Group of voltage regulators 134 include one or more voltage regulators for controlling a respective converter or regulator circuit, not shown in FIG. 1. Each one of voltage regulators 134 receives a respective input voltage labeled "VIN" and outputs an output voltage labeled "VOUT". Group of fault circuits 135 includes one or more circuits for monitoring fault conditions of PMIC 130, each having an output for providing a respective signal labeled "FAULT" for indicating a fault in the power management operation. In alternative embodiments, one or more of the external terminals of controller 132, timer 133, and/or fault circuits 135 are removed. In one embodiment, PMIC 130 is integrated as a monolithic integrated circuit. In an alternative embodiment, PMIC 130 is combined in the same package as data processor 110. In another alternative embodiment, interface circuit 131, controller 132, and timer 133 are implemented on an integrated circuit without the power management circuits. In yet another alternative embodiment, interface circuit 131, controller 132, and timer 133 are implemented on an integrated circuit with a circuit other than a power management circuit. PMIC 130 shows one particular example of how the functions of a system watchdog timer can be efficiently combined with other circuits in a single integrated circuit to keep system cost low, but many other combinations are possible.

Intercommunication bus 120 can operate according to any of a number of bus protocols, such as the system management bus (SMBus) protocol, the inter integrated circuit bus protocol, the serial peripheral bus protocol, and the like. In one embodiment, all of data processing system 100 is in a single integrated circuit. In an alternative embodiment, data processing system 100 is implemented using multiple integrated circuits.

In operation, data processor 110 performs various conventional data processing functions in response to executing stored program instructions. Data processor 110 also accesses a system Q&A watchdog timer through bus interface circuit 116 using the techniques disclosed herein. PMIC 130 operates as the system Q&A watchdog timer, in addition to performing other power management functions. It performs a system level Q&A watchdog function of data processing system 100 using interface circuit 131, controller 132, and timer 133.

In an example embodiment, PMIC 130 generates an initial question and data processor 110 responsively generates an initial answer and a corresponding initial data code. PMIC 130 subsequently compares the initial answer with the initial question and the corresponding initial data code with an expected data code. If either comparison results in a mismatch, PMIC 130 performs a remedial action of data processing system 100. In the embodiment shown in FIG. 1, the remedial action is activating the RESET signal, which causes data processor 110 to initiate a reset sequence of CPU 111. If both comparisons result in a match, controller 132 resets timer 133, stores the received corresponding initial data code as a subsequent question, and awaits a new answer and corresponding data code from data processor 110. In this example embodiment, data processor 110 calculates subsequent answers and corresponding data codes from the initial question read from PMIC 130. Data processing system 100 decreases traffic on intercommunication bus 120 by calculating corresponding error codes from the initial question in data processor 110 and verifying correct calculations in PMIC 130 without requiring a new question for each subsequent answer following the initial question, while preserving the security of the Q&A watchdog timing function. In one embodiment, the corresponding data code is a package error code calculated by data processor 110 performing a CRC operation on a packet including the answer. In this case, the CRC operation may be performed by either a software program of CPU 111 or CRC circuit 116*a*. In another embodiment, the corresponding data code is calculated using an algorithm performed by CPU 111. In yet another embodiment, the corresponding data code is retrieved from a lookup table stored within memory 112. The described controller 132 compares the received answer with a stored question, however other implementations may accept any value for the received answer. In the described embodiment, timer 130 is a timeout timer; however, other implementations of timers may be used, such as windowed timers.

Figure 3:
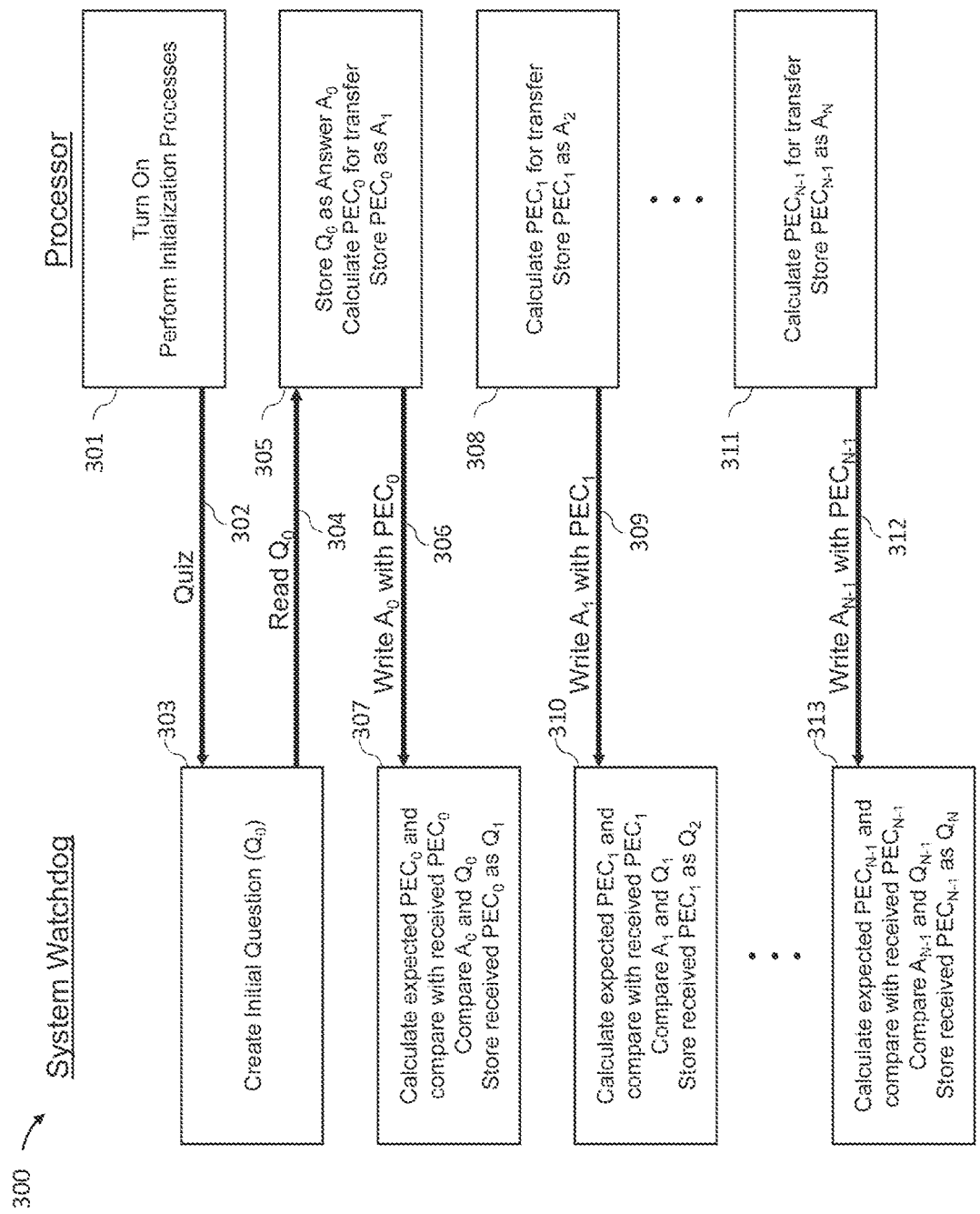
FIG. 3 illustrates a flow chart of a process associated with the operation of the data processing system of FIG. 1.

FIG. 3 illustrates a flow chart of a process 300 associated with the operation of data processing system 100 of FIG. 1. Process 300 may be performed using circuits similar to or identical to a combination of data processor 110, intercommunication bus 120, and PMIC 130. Process 300 begins at block 301, when the data processing system is turned on. After turning on, a data processor begins an initialization process. In one example, the data processor initializes a system watchdog timer by performing action 302, where a signal labeled "Quiz" is sent to the system watchdog timer, and the process proceeds to block 303.

At block 303, the system watchdog timer creates an initial question labeled "$Q_0$" and starts a timer. After $Q_0$ is generated, the data processor performs action 304 by reading $Q_0$ and the process subsequently proceeds to block 305. At block 305, the data processor stores $Q_0$ as an initial answer labeled "$A_0$" and subsequently calculates a data code labeled "$PEC_0$". In one example, $PEC_0$ is a package error code calculated by performing a CRC operation on $A_0$. The data processor stores $PEC_0$ as a subsequent answer labeled "$A_1$".

After $A_0$ is stored and $PEC_0$ is calculated, the data processor performs action 306 by writing $A_0$ and $PEC_0$ to the system watchdog timer, and the process proceeds to block 307. In one example, $A_0$ and $PEC_0$ are communicated to the system watchdog timer using a packet of information, wherein the packet includes $A_0$ and additional information, and wherein $PEC_0$ is appended to the packet. At block 307, the system watchdog timer receives $A_0$ and $PEC_0$ and subsequently calculates an expected value of $PEC_0$. In one example, the expected value of $PEC_0$ is calculated by performing a CRC operation on $Q_0$ (since the data processor provides $A_0$ as $Q_0$). The system watchdog timer then compares the expected value of $PEC_0$ with the received $PEC_0$. In one example, the expected value of $PEC_0$ is compared with the received $PEC_0$ in a bus interface circuit (such as interface circuit 131 of FIG. 1) as part of a communication process.

In this case, if there is a mismatch between the received $PEC_0$ and the expected value of $PEC_0$, the system watchdog timer may signal a bus error, causing the data processor to retry transmitting the packet according to existing bus error protocols.

If the expected value of $PEC_0$ matches the received $PEC_0$, the system watchdog timer compares $A_0$ with $Q_0$. In this case, if there is a mismatch between $A_0$ and $Q_0$, the system watchdog timer performs a remedial action of the data processing system.

If $A_0$ matches $Q_0$, the system watchdog timer resets its timer and stores the received $PEC_0$ as a subsequent question labeled "$Q_1$". After a predetermined period, the process proceeds to block 308, where the data processor calculates a subsequent data code labeled "$PEC_1$," from $A_1$ and stores $PEC_1$ as a tertiary answer labeled "$A_2$". After $PEC_1$ is calculated, the data processor performs action 309 by writing $A_1$ and $PEC_1$ to the system watchdog timer, and the process proceeds to block 310. At block 310, the system watchdog timer receives $A_1$ and $PEC_1$ and subsequently calculates an expected value of $PEC_1$. Similar to block 307, the system watchdog timer compares the received the received $PEC_1$ with the expected value of $PEC_1$. If there is a mismatch between the received $PEC_1$ and the expected value of $PEC_1$, the system watchdog timer may signal a bus error, causing the data processor to retry transmitting the packet according to existing bus error protocols. If the expected value of $PEC_1$ matches the received $PEC_1$, the system watchdog timer compares $A_1$ with $Q_1$. If there is a mismatch between $A_0$ and $Q_0$, the system watchdog timer performs a remedial action of the data processing system. If $A_0$ matches $Q_0$, the system watchdog timer resets its timer and stores the received $PEC_1$ as a tertiary question labeled "$Q_2$". The data processor and the system watchdog timer repeat steps similar to those described for block 308, action 309, and 310 as indicated by the dots between blocks 308 and 311 and between blocks 310 and 313. These steps repeat until the timer of the system watchdog timer expires, the data processing system is turned off, or another intervening event occurs.

Process 300 is stopped at any time if the timer of the system watchdog timer expires before it receives an answer from the data processor. Note that the timer of the system watchdog timer can be implemented in a variety of ways. For example, in one embodiment, the timer is a timeout timer that expires after it reaches a timeout threshold. In another embodiment, the timer is a closed window timer, where the timer provides an error signal if the system watchdog timer receives an answer from the data processor before the timer reaches an open window threshold, which occurs before the timeout threshold is reached. In yet another embodiment, the timer is a closed window timer that ignores answers received before the timer reaches the open window threshold and does not provide an error signal during the closed window.

In the described embodiment, data codes and expected values of data codes can be package error codes calculated using a CRC operation. Implementations of process 300 using a CRC operation can use any various CRC polynomials. For example, one implementation uses a CRC-8 polynomial 1 0000 0111.

The technique described above provides robustness due to the complex relationship between the state of the system and the next query, while significantly reducing bus traffic. In systems with pre-existing bus error detection mechanisms, it also leverages existing system resources, e.g., CRC generation circuitry, to prevent random patterns caused by runaway code from accidentally resetting the system watchdog timer. To check the reliability not only of data processor 110 but also system watchdog timer 130, system watchdog timer 130 could calculate $Q_0$ using a complex but deterministic calculation, and the data processor could check whether the $Q_0$ provided over the bus by system watchdog timer 130 matches, and data processor 110 could take an appropriate remedial action or actions.

While the described embodiment of process 300 details a CRC operation used to calculate package error codes and expected values of package error codes, other implementations may calculate data codes using other methods. For example, the data processor can calculate new data codes in blocks 305, 308, and 311 by using an algorithm, look-up table, external data, or other method. Similarly, the system watchdog timer can calculate an expected value of the data codes in blocks 307, 310, and 313 by using an algorithm, look-up table, external data, or other method. In some implementations, the data processor and the system watchdog timer use the same method to calculate their respective data codes. In other implementations, the data processor and the system watchdog timer use different methods to calculate their respective data codes. For example, one embodiment has the data processor calculates the data code using software, while the system watchdog timer calculates the expected data code using hardware.

In some embodiments, the system watchdog timer can be initialized by an event other than action 302 of process 300. For example, one embodiment initializes the system watchdog timer through an external signal, such as signal EXT of FIG. 1. Another embodiment initializes the system watchdog timer by powering on the system watchdog timer separately from the data processor, such as using input voltage VIN of FIG. 1. In these cases, the process does not include action 302, but otherwise operates similar to process 300. In an alternative embodiment, the system watchdog timer does not compare the received answer with its stored question. In this case, the system watchdog timer accepts any value for the received answer and still performs the comparison between the received data code and the expected value of the data code in blocks 307, 310, and 313, but otherwise the process operates similar to process 300. In the described embodiment, at block 307 the system watchdog timer performs a remedial action immediately following a mismatch between the received answer and the stored question. In an alternative embodiment, the system watchdog timer does not perform a remedial action of the data processing system in response to a mismatch between the received answer and the stored question, and instead refrains from resetting its timer. In this case, the system watchdog timer may reset its timer if a correct answer is received before the timer expires.

Figure 4:
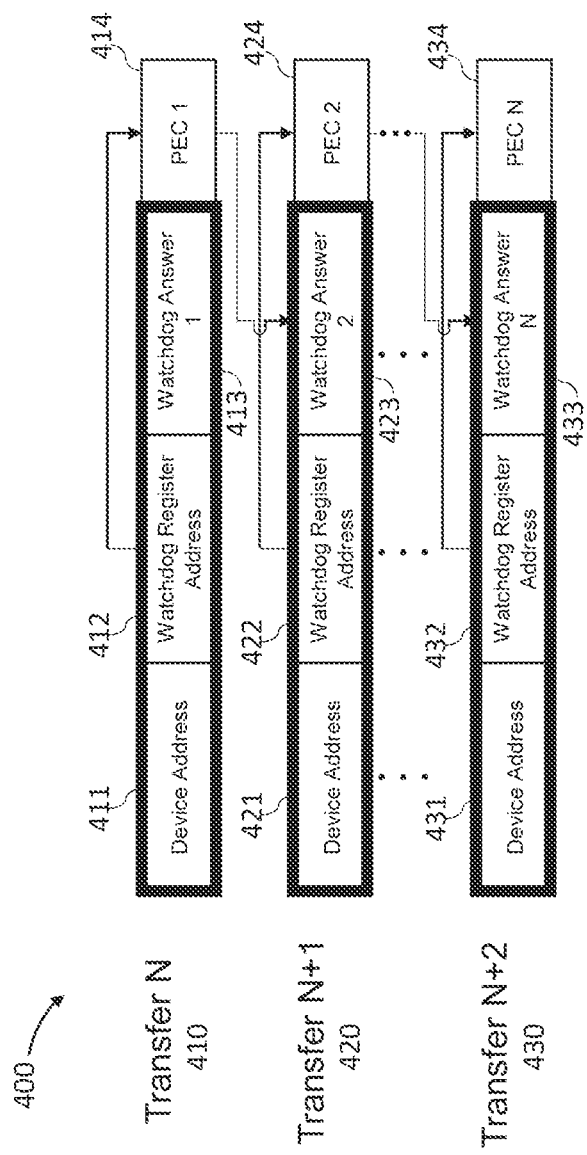
FIG. 4 illustrates a flow chart of a process associated with the operation of a data processor that can be used as the data processor of FIG. 1.

FIG. 4 illustrates a flow chart of a process 400 associated with the operation of a data processor that can be used as data processor 110 of FIG. 1. Process 400 shows updates of data transfers 410 labeled "Transfer 1", 420 labeled "Transfer 2", and 430 labeled "Transfer N" from the data processor to its associated system watchdog timer. Transfer 1 includes device address 411, watchdog register address 412, first watchdog answer 413 labeled "Watchdog Answer 1", and first package error code 414, labeled "PEC 1". The data processor calculates PEC 1 by performing a CRC operation on device address 411, watchdog register address 412, and Watchdog Answer 1. PEC 1 is then appended to the end of Transfer 1 and stored as second watchdog answer 423 of Transfer 2 labeled "Watchdog Answer 2", and the data processor subsequently writes Transfer 1 to its associated system watchdog timer. After a predetermined period, the data processor prepares Transfer 2 in the same way it prepared Transfer 1. This process repeats as shown by the dots between Transfer 2 and Transfer N until the data processor receives a remedial action from its associated system watchdog timer, the data processor is shut down, or another intervening event occurs. A variety of CRC operations and polynomials can be used to perform the CRC operation described in process 400. For example, one embodiment generates package error codes using a CRC-8 operation with a polynomial 1 0000 0111.

Figure 5:
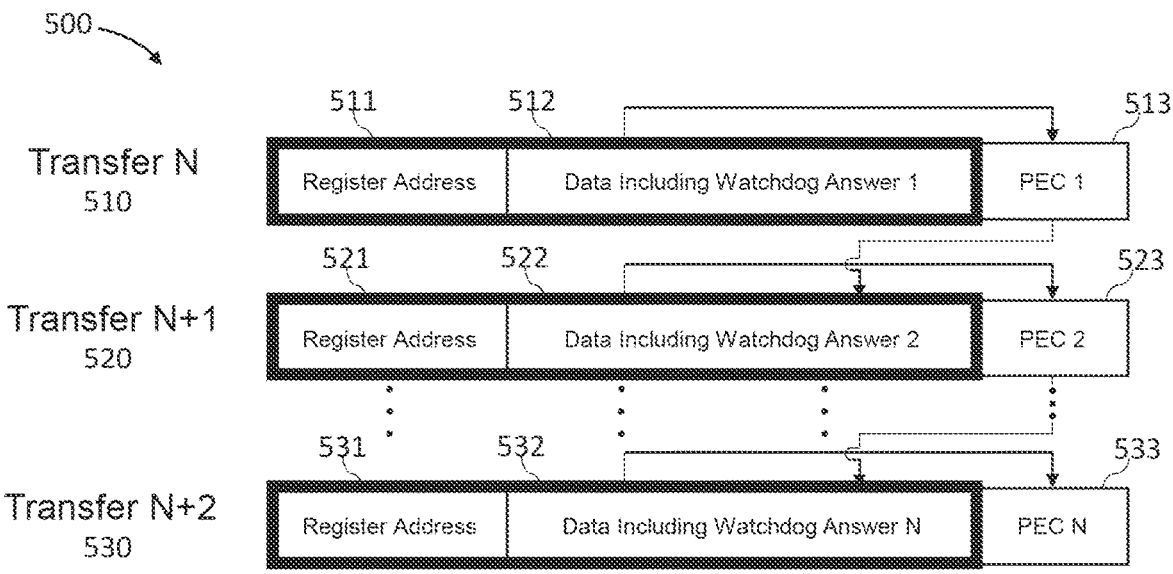
FIG. 5 illustrates a flow chart of another process associated with the operation of another data processor that can be used as the data processor of FIG. 1.

FIG. 5 illustrates a flow chart of another process 500 associated with the operation of another data processor that can be used as data processor 110 of FIG. 1. Process 500 shows updates of data transfers 510 labeled "Transfer 1", 520 labeled "Transfer 2", and 530 labeled "Transfer N" from the data processor to its associated system watchdog timer. Transfer 1 includes register address 511, data 512 including a first watchdog answer labeled "Watchdog Answer 1", and package error code 513 labeled "PEC 1". The data processor calculates PEC 1 by performing a CRC operation on register address 511 and data 512. PEC 1 is then appended to the end of Transfer 1 and stored as a second watchdog answer labeled "Watchdog Answer 2" within data 522 of Transfer 2, and the data processor subsequently writes Transfer 1 to its associated system watchdog timer. After a predetermined period, data processor prepares Transfer 2 in the same way it prepared Transfer 1. This process repeats as shown by the dots between Transfer 2 and Transfer N until the data processor receives a remedial action from its associated system watchdog timer, the data processor is shut down, or another intervening event occurs. A variety of CRC operations and polynomials can be used to perform the CRC operation described in process 500. For example, one embodiment generates package error codes using a CRC-8 operation with a polynomial 1 0000 0111.

Figure 6:
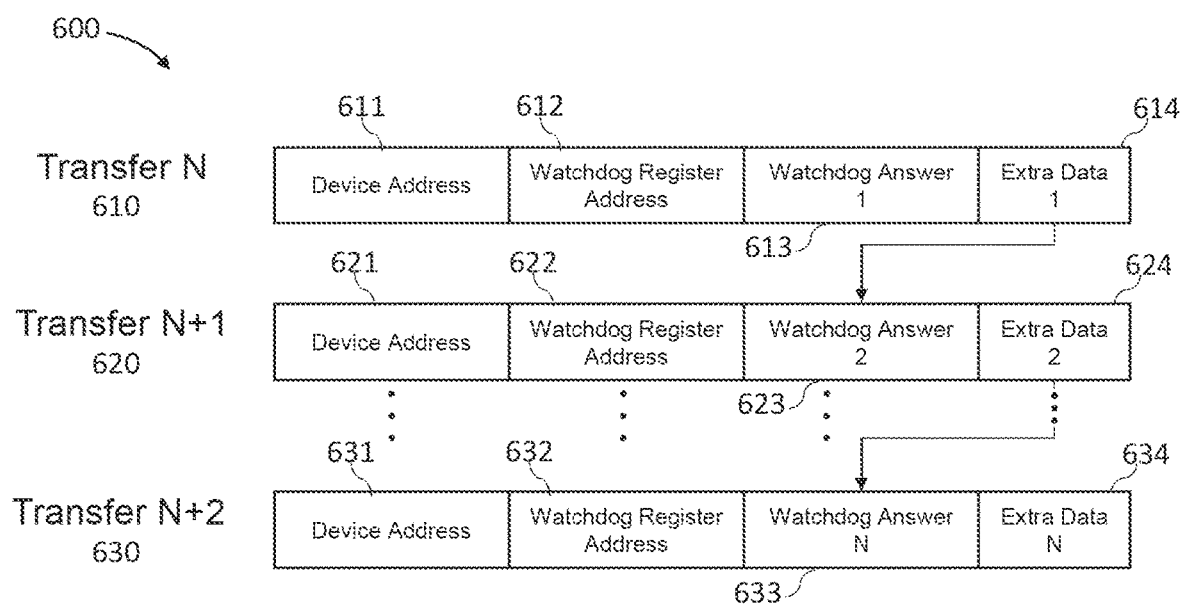
FIG. 6 illustrates a flow chart of a yet another process associated with the operation of yet another data processor that can be used as the data processor of FIG. 1.

FIG. 6 illustrates a flow chart of a yet another process 600 associated with the operation of yet another data processor that can be used as data processor 110 of FIG. 1. Process 600 shows updates of data transfers 610 labeled "Transfer 1", 620 labeled "Transfer 2", and 630 labeled "Transfer N" from the data processor to its associated system watchdog timer. Transfer 1 includes device address 611, watchdog register address 612, first watchdog answer 613 labeled "Watchdog Answer 1", and data code 614, labeled "Extra Data 1". The data processor calculates Extra Data 1 by performing an algorithm, searching a lookup table, or utilizing another method. Extra Data 1 is then appended to the end of Transfer 1 and stored as second watchdog answer 623 of Transfer 2 labeled "Watchdog Answer 2", and the data processor subsequently writes Transfer 1 to its associated system watchdog timer. After a predetermined period, the data processor prepares Transfer 2 in the same way it prepared Transfer 1. This process repeats as shown by the dots between Transfer 2 and Transfer N until the data processor receives a remedial action from its associated system watchdog timer, the data processor is shut down, or another intervening event occurs.

Processes 400, 500, and 600 provide exemplary implementations of preparing data transfers from a data processor to its associated system watchdog timer. Embodiments of the present disclosure may reduce bus traffic while preserving the security of the Q&A watchdog timing function by calculating new answers using previous answers instead of requiring a new question from the system watchdog timer for each cycle.

Various embodiments of system watchdog timers and their associated systems have been described above wherein either the system watchdog timer or a data processor performs a remedial action of the data processing system. For example, in one embodiment, the system watchdog timer sends a request to the data processor. In this case, the request can either shut down the data processing system, reset the entirety of the data processing system, or soft-reset a portion of the data processor. In another embodiment, the system watchdog timer initiates a multi-step error management process. One example implementation of such a process includes the system watchdog timer interrupting the data processor by requesting a retransmission of the most recently written answer and corresponding error code in response to detecting a first error, soft-resetting the data processor in response to detecting a subsequent second error, and shutting down the data processor in response to detecting a subsequent third error. In yet another embodiment, the system watchdog timer performs a remedial action on its own integrated circuit in place of or in addition to the data processor. In yet another embodiment, the data processor detects an error in a question read from the system watchdog timer. In this case, the data processor may re-send a quiz to the system watchdog timer, shutdown the system watchdog timer, shutdown, perform a reset, or perform another remedial action of the data processing system.

Thus various embodiments of a data processing system, a data processor, and a system watchdog timer have been described. The various embodiments reduce bus traffic while maintaining system level Q&A watchdog timing functionality.

The above-disclosed subject matter is to be considered illustrative, and not restrictive, and the appended claims are intended to cover all such modifications, enhancements, and other embodiments that fall within the true scope of the claims. For example particular blocks of a data processing system, data processor, and system watchdog timer can vary in different embodiments. Moreover the data processing system, data processor, and watchdog timer described above can be used in different architectures. For example, various embodiments of system watchdog timers can be implemented in both single integrated circuit applications and multiple integrated circuit applications. Furthermore, the system watchdog timer may be implemented as a standalone watchdog timer device, a power management circuit, or another peripheral of the data processing system.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A circuit comprising a system watchdog timer, the system watchdog timer comprising:
    an interface circuit adapted to be coupled to a bus having a predetermined protocol;
    a timer; and
    a controller coupled to said interface circuit and said timer,
    wherein:
        in response to a startup signal, said controller starts said timer and generates an initial question;
        in response to receiving an initial answer and an initial data code from said bus, said interface circuit calculates an expected data code and compares said expected data code to said initial data code;
        in response to a mismatch between said expected data code and said initial data code, said interface circuit provides a bus error signal to said bus; and in response to a match between said expected data code and said initial data code, said interface circuit provides said initial answer and said initial data code to said controller, and said controller subsequently compares said initial answer with said initial question, wherein:
in response to a match between said initial answer and said initial question, said controller resets said timer and stores said initial data code as a subsequent question; and
in response to a mismatch between said initial answer and said initial question, the system watchdog timer performs a remedial action of the circuit.

2. The circuit of claim 1, wherein said timer has a first period including a closed window and a second period including an open window, wherein:
in response to receiving said initial answer and said initial data code during said first period of said timer, said controller performs said remedial action.

3. The circuit of claim 1 further comprising a power management circuit, wherein said power management circuit and the system watchdog timer are integrated within an integrated circuit package.

4. The circuit of claim 1, further comprising:
a data processor coupled to the system watchdog timer via said bus,
wherein:
said data processor provides said startup signal and reads said initial question from the system watchdog timer over said bus; and
in response to reading said initial question, said data processor stores said initial question as said initial answer, calculates said initial data code, stores said initial data code as a subsequent answer, and writes said initial answer and said initial data code to the system watchdog timer.

5. The circuit of claim 4, wherein said data processor, said bus, and the system watchdog timer are combined within an integrated circuit package.

6. The circuit of claim 4, wherein said data processor is within a first integrated circuit package, the system watchdog timer is within a second integrated circuit package, and said bus couples said first integrated circuit package to said second integrated circuit package.

7. The circuit of claim 4, wherein said data processor communicates with the system watchdog timer using a packet that includes a corresponding answer, and provides a data code by performing a cyclic redundancy check operation on said packet and appending said data code to said packet, wherein said data processor uses said data code as an answer for a subsequent packet.

8. The circuit of claim 7, wherein said data processor includes a bus interface circuit, wherein said bus interface circuit performs said CRC operation using a CRC circuit.

9. The circuit of claim 7, wherein said data processor includes a central processing unit, wherein said central processing unit performs said CRC operation using a software algorithm.

10. The circuit of claim 1, wherein said controller calculates said expected data code by performing a CRC operation on said initial question.

11. A method of performing a system watchdog operation of a data processing systm using a system watchdog timer comprising:
creating an initial question;
starting a timer of the system watchdog timer;
receiving an initial answer and an initial data code;
calculating an expected data code in response to said initial question;
comparing said initial data code to said expected data code;
in response to a mismatch between said initial data code and said expected data code, generating a bus error signal; and
in response to a match between said initial data code and said expected data code, comparing said initial answer to said initial question, wherein:
in response to a match between said initial answer and said initial question, resetting said timer and storing said initial data code as a subsequent question; and
in response to a mismatch between said initial answer and said initial question, performing a remedial action of the data processing system.

12. The method of claim 11, further comprising:
reading said initial question in response to said creating and subsequently storing said initial question as said initial answer by a data processor;
calculating said initial data code and subsequently storing said initial data code as a subsequent answer by said data processor; and
writing said initial answer and said initial data code to the system watchdog timer.

13. The method of claim 12, wherein said calculating said initial data code comprises performing a CRC operation on a packet, said packet including said initial answer, and wherein the method further comprises appending said initial data code to said packet.

* * * * *

UNITED STATES PATENT AND TRADEMARK OFFICE
CERTIFICATE OF CORRECTION

PATENT NO. : 11,520,654 B2
APPLICATION NO. : 17/248690
DATED : December 6, 2022
INVENTOR(S) : Philippe Debosque, Cornelis Hermanus Voorwinden and Philippe Quarmeau It is certified that error appears in the above-identified patent and that said Letters Patent is hereby corrected as shown below:

In the Claims

In Column 10, Line 14, delete "systm" and replace with -- system --

Signed and Sealed this
Thirty-first Day of January, 2023

Katherine Kelly Vidal
*Director of the United States Patent and Trademark Office*